United States Patent
Seidl

(10) Patent No.: US 11,684,201 B2
(45) Date of Patent: Jun. 27, 2023

(54) BEVERAGE-DISPENSING MACHINE

(71) Applicant: LUIGI LAVAZZA S.P.A., Turin (IT)

(72) Inventor: Florian Seidl, Turin (IT)

(73) Assignee: Luigi Lavazza S.p.A., Turin (IT)

(*) Notice: Subject to any disclaimer, the term of this patent is extended or adjusted under 35 U.S.C. 154(b) by 636 days.

(21) Appl. No.: 16/624,397

(22) PCT Filed: Jun. 12, 2018

(86) PCT No.: PCT/IB2018/054238
§ 371 (c)(1),
(2) Date: Dec. 19, 2019

(87) PCT Pub. No.: WO2018/234927
PCT Pub. Date: Dec. 27, 2018

(65) Prior Publication Data
US 2021/0145206 A1 May 20, 2021

(30) Foreign Application Priority Data

Jun. 20, 2017 (IT) .................. 102017000068264

(51) Int. Cl.
*A47J 31/44* (2006.01)
*A47J 31/52* (2006.01)
*A47J 31/36* (2006.01)

(52) U.S. Cl.
CPC ....... *A47J 31/4403* (2013.01); *A47J 31/3676* (2013.01); *A47J 31/52* (2013.01)

(58) Field of Classification Search
CPC ..... A61J 31/4403; A61J 31/3676; A61J 31/52
See application file for complete search history.

(56) References Cited

U.S. PATENT DOCUMENTS

| 10,087,669 | B1 * | 10/2018 | Gnadinger | B67D 1/08 |
| 10,221,058 | B2 * | 3/2019 | Dresser | B67D 1/06 |
| 10,299,623 | B2 * | 5/2019 | Zeijlstra | A47J 31/4496 |
| 10,460,569 | B2 * | 10/2019 | Kennedy | G07F 17/3216 |
| 10,937,280 | B2 * | 3/2021 | Kennedy | G07F 17/42 |
| 11,344,149 | B2 * | 5/2022 | Byun | A47J 31/4403 |

(Continued)

FOREIGN PATENT DOCUMENTS

| CN | 1508332 A | 6/2004 |
| CN | 201054307 Y | 4/2008 |

(Continued)

OTHER PUBLICATIONS

Office Action dated Feb. 20, 2021, issued in China Application No. 201880041648.X, 8 pages.

(Continued)

*Primary Examiner* — Michael Collins
(74) *Attorney, Agent, or Firm* — Nixon & Vanderhye P.C.

(57) ABSTRACT

A beverage-dispensing machine (10), for example, a machine for preparing coffee at home, is configured for being positioned in at least one first position and at least one second position that are rotated (a) with respect to one another about an axis of orientation (X10). The machine (10) comprises a user-interface element (20) carried by the machine in a rotatable way about the aforesaid axis of orientation (X10), with the interface element (20) that is configured to maintain a certain spatial orientation independently of the position of the machine (10).

8 Claims, 2 Drawing Sheets

(56) References Cited

U.S. PATENT DOCUMENTS

| | | | | |
|---|---|---|---|---|
| 11,572,266 | B2* | 2/2023 | Ravindran | B67D 1/0892 |
| 2009/0124395 | A1* | 5/2009 | O'Keene | G07F 17/32 |
| | | | | 463/46 |
| 2012/0323362 | A1* | 12/2012 | Paydar | G07F 9/002 |
| | | | | 29/434 |
| 2013/0046397 | A1 | 2/2013 | Fadell et al. | |
| 2016/0346743 | A1* | 12/2016 | Snider | B01F 35/2209 |
| 2017/0101299 | A1* | 4/2017 | Dresser | B67D 1/0888 |

FOREIGN PATENT DOCUMENTS

| | | |
|---|---|---|
| CN | 103341762 A | 10/2013 |
| CN | 203400001 U | 1/2014 |
| CN | 203574962 U | 4/2014 |
| CN | 105120719 A | 12/2015 |
| FR | 2853116 A1 | 10/2004 |

OTHER PUBLICATIONS

Bryman, Howard, "Monumentally Modest, the Decent Espresso Machine Brings Wave of Innovation," Daily Coffee News, Nov. 25, 2016, https://dailycoffeenews.com/2016/11/25/monumentally-modest-the-decent-espresso-machine-brings-wave-of-innovation/, 15 pages.
International Search Report and Written Opinion of the ISA for PCT/IB2018/054238, dated Jul. 25, 2018, 10 pages.
Anonymous, "Anyone planning on going to CoffeeFest in Portland", Oct. 23-Oct. 25, Oct. 24, 2015, 7 pages.
Bryman, "Monumentally Modest, the Decent Espresso Machine Brings Wave of Innovation", Nov. 25, 2016, 8 pages.
Di Tommaso, Paolo, et al., "T-Coffee: a web server for the multiple sequence alignment of protein and RNA sequences using structural information and homology extension", Nucleic Acids Research, vol. 29, 2011, pp. W13-W17.
Tie-Yan, Si, et al., "Physical biology of bacterial motility", Acta Physica Sinica, vol. 65, No. 17, 2016, pp. 178703-1-178703-15.
Notice of Attending to Patent Registration dated Feb. 18, 2022, issued in China Patent Application No. 201880041648.X, 5 pages.

* cited by examiner

BEVERAGE-DISPENSING MACHINE

This application is the U.S. national phase of International Application No. PCT/IB2018/054238 filed 12 Jun. 2018, which designated the U.S. and claims priority to IT Patent Application No. 102017000068264 filed 20 Jun. 2017, the entire contents of each of which are hereby incorporated by reference.

TECHNICAL FIELD

The present disclosure relates to machines for dispensing beverages.

One or more embodiments may regard machines for preparing beverages such as coffee, for example espresso coffee. Reference to this possible field of application is on the other hand provided purely by way of non-limiting example of the embodiments.

Technological Background

The sector of beverage-dispensing machines is in continuous evolution, also considering the increasing diffusion of these machines (which once were prevalently used in public premises) in the domestic environment, for example as machines for preparing beverages such as coffee (for example, espresso coffee).

This evolution causes technical problems to emerge that once were considered of lesser importance, for example, as regards possible positioning and/or placing of the machine (for instance, on a surface of a piece of kitchen furniture).

It is hence desirable to be able to provide solutions that are able to meet requirements that may arise in these new contexts of use.

Object and Summary

An object of one or more embodiments is to contribute to providing solutions of the above nature.

According to one or more embodiments, the above object is achieved thanks to a beverage-dispensing machine having the characteristics recalled in the ensuing claims.

The claims form an integral part of the technical teachings provided herein in relation to the embodiments.

BRIEF DESCRIPTION OF THE DRAWINGS

One or more embodiments will now be described, purely by way of non-limiting example, with reference to the annexed drawings, wherein.

DETAILED DESCRIPTION

In the ensuing description, various specific details are illustrated aimed at providing an in-depth understanding of various examples of embodiments. The embodiments may be obtained without one or more of the specific details, or with other methods, components, materials, etc. In other cases, known structures, materials, or operations are not illustrated or described in detail so that the various aspects of the embodiments will not be obscured. Reference to "an embodiment" or "one embodiment" in the framework of the present description is meant to indicate that a particular configuration, structure, or characteristic described in relation to the embodiment is comprised in at least one embodiment. Consequently, phrases such as "in an embodiment", "in one embodiment", or the like, that may be present in various points of the present description do not necessarily refer exactly to one and the same embodiment. Moreover, particular conformations, structures, or characteristics may be combined in any adequate way in one or more embodiments.

The references used herein are provided merely for convenience and hence do not define the sphere of protection or the scope of the embodiments.

Figure 1:
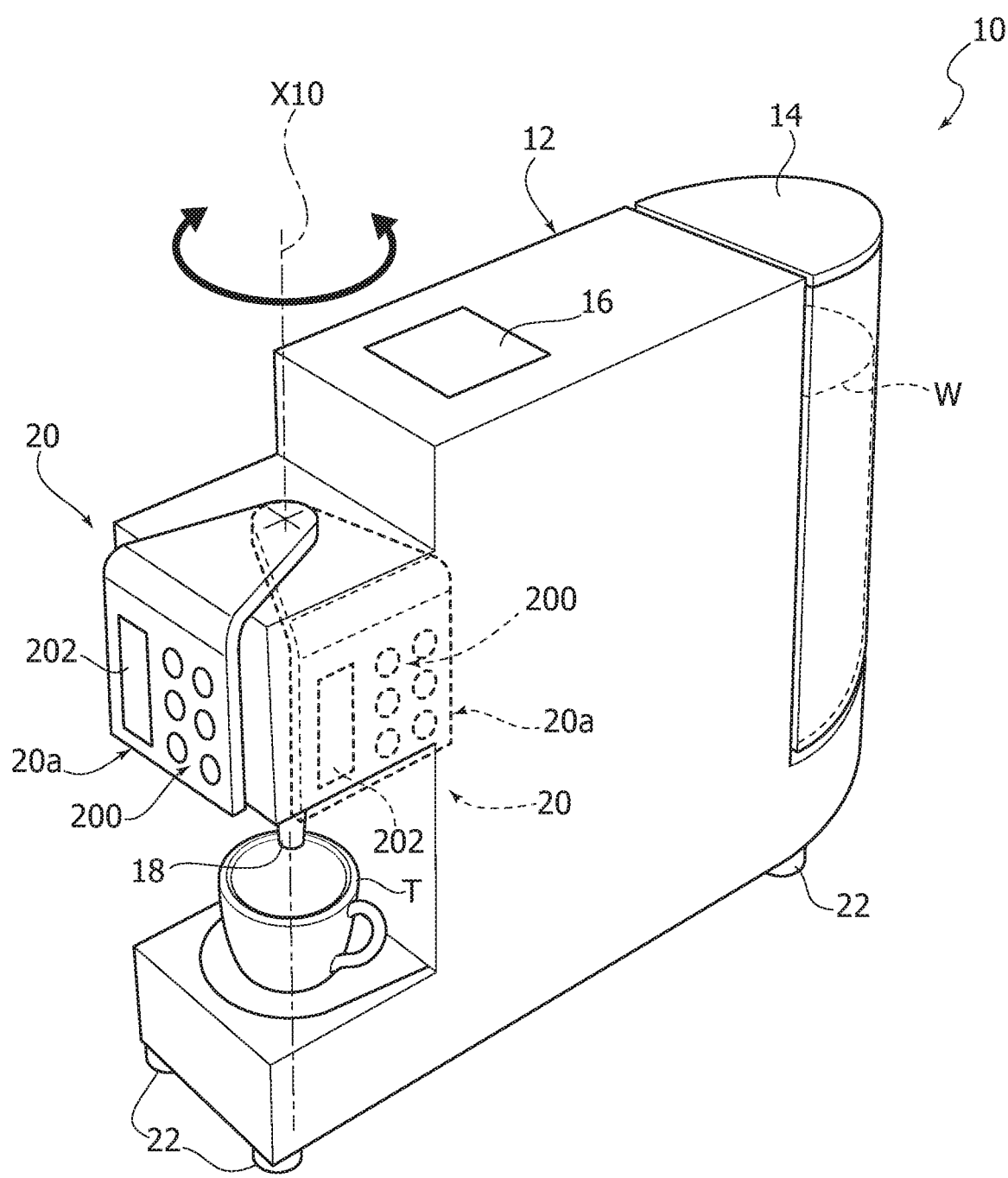
FIG. 1 is a perspective view of a beverage-dispensing machine according to one or more embodiments.

In FIG. 1, the reference 10 designates as a whole a beverage-dispensing machine. This may be, for example, a machine for home preparation of beverages such as coffee (for example, espresso coffee). As has already been said, reference to this possible context of use is not to be understood as in any way limiting the embodiments.

A machine such as the machine 10 exemplified herein may comprise a body 12 in which the internal members of the machine are provided. These may comprise, for example, a pump, which is designed to take in water W contained in a tank 14 and supply it to a heater (boiler), which is designed to heat the water with generation of hot water and steam. The latter, once supplied to an infusion chamber, enable preparation of a beverage such as coffee (for example, espresso coffee) causing the hot water and steam to pass through the ground coffee contained in a capsule or pod, which can be inserted in the body 12 through a supply hatch 16. The beverage thus prepared can be delivered starting from a nozzle or spout 18, for example into a cup T set in a portion for delivery of the beverage.

Beverage-dispensing machines of this type are in themselves known in the art, which renders superfluous any description in further detail herein, for example as regards the structure and the modes of operation of the internal members referred to previously.

In recent times, the trend has been to produce machines 10 such as the one exemplified herein that can be set in different positions according to the requirements of application and use.

Figure 2:
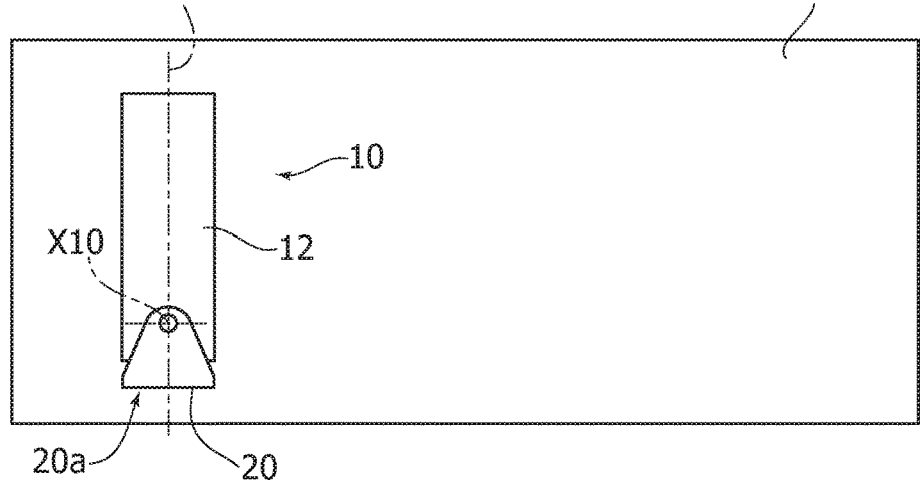
FIGS. 2 to 4 illustrate possible modes of use of such a machine.
Figure 3:
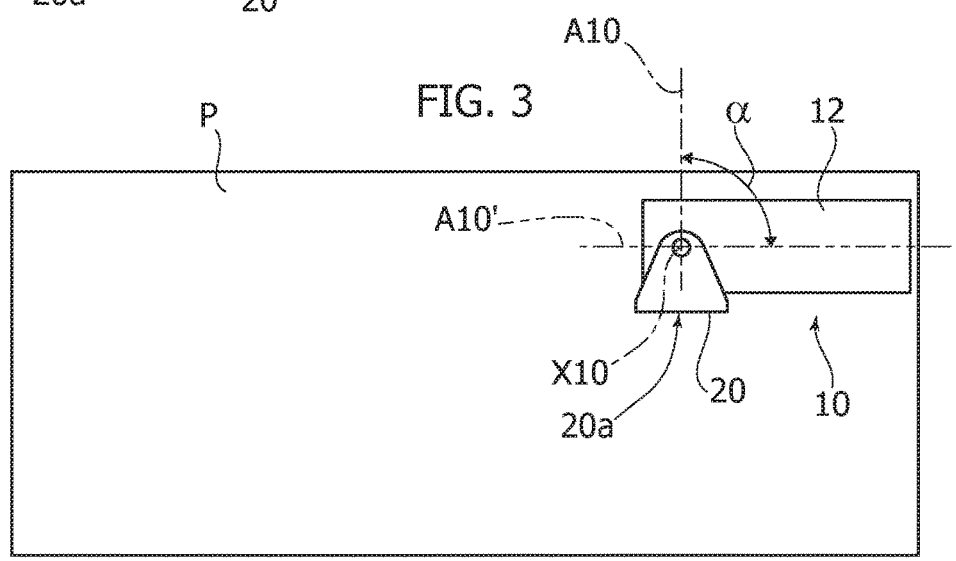
Figure 4:
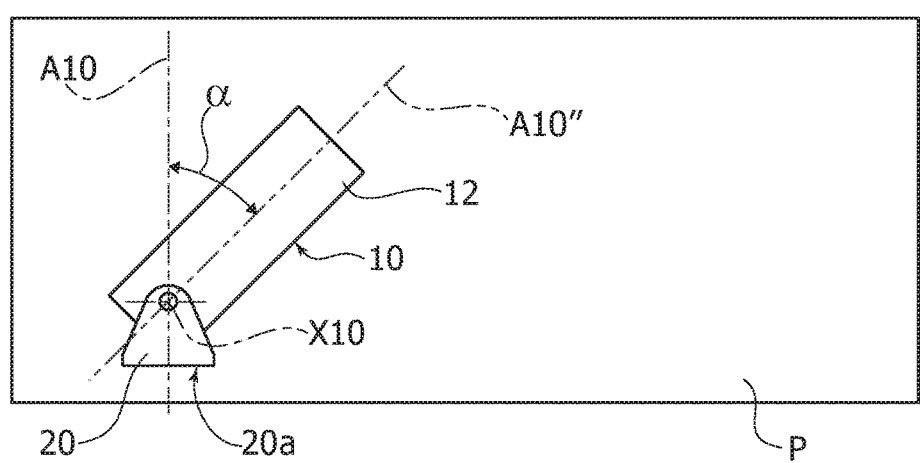

For example, the figures refer (of course, purely by way of example) to a machine 10 having an as a whole flat body 12 with vertical development which can be set in different ways, for example, on a surface P of a piece of furniture such as kitchen furniture—as illustrated schematically in an ideal top plan view in FIGS. 2 to 4.

For example, FIG. 2 refers to a situation in which the machine 10 is set on the surface P arranged, so to speak, sideways on, with its main direction of extension aligned with a reference plane A10 (for example, a vertical plane extending in the direction of depth of the surface P).

FIG. 3 exemplifies the possibility of the machine 10 being arranged, so to speak, lengthwise, turned through 90° with respect to the previous position, i.e., with the main direction of extension of the machine 10 oriented according to a plane A10' that forms an angle α (in the case exemplified in FIG. 3 equal to 90°) with respect to the plane A10 referred to previously.

FIG. 4 exemplifies the fact that the machine 10 can also be arranged with the main direction of extension thereof aligned with a plane A10" that forms, with respect to the plane A10, an angle α which can assume any value, for example any value comprised between 0° and 90° (or in an even wider range); reference to these values is of course provided purely by way of example: as may be appreciated from FIGS. 2 to 4, the choices of use may be extremely wide.

The various positions that can be assumed by the machine 10, as represented by way of example in FIGS. 2 to 4, may be viewed as corresponding to different angular positions with respect to an axis of orientation X10 that, in the example considered herein, may be viewed as a vertical axis.

In the examples presented herein (which, it is emphasized, are merely examples) it is assumed that the body 12 of the machine has an overall flat development and is provided with resting formations (for example, a bottom surface or feet 22) that keep the machine 10 in the resting position with the axis X10 oriented in the vertical direction: of course, this indication is provided purely by way of non-limiting example of the embodiments.

Machines such as the machine 10 exemplified herein may be provided with a user interface 20, such as an element (e.g., a panel) on which, for example, pushbuttons 200 and/or display elements 202 may be provided designed to facilitate operation and/or control of the machine 10. For example, the pushbuttons and/or the one or more displays 202 may be provided on a front face 20a of the interface element 20.

One or more embodiments may be based upon recognition of the fact that the different (angular) positioning of the body of the machine 10, for example on a resting surface P, may in any case be considered as a rotation with respect to an axis of orientation such as the axis X10 exemplified in FIGS. 2 to 4, it being possible for such an axis to be in general chosen freely in any point of the body 12 and, possibly, even on the outside of the body.

One or more embodiments may envisage that the interface element 20 is rotatably mounted with respect to the body 12 of the machine 10, for example, with the capacity of orientation about an axis that can be made to coincide with the axis X10.

As illustrated in FIGS. 2 to 4, by exploiting the capacity of orientation (rotation) of the interface element 20 with respect to the body 12 of the machine, it is possible to obtain that, whatever the position of the machine 10, the interface element 20 can be held in a certain desired spatial orientation independently of the position in which the machine is set.

For example, FIGS. 2 to 4 exemplify the possibility of rotating the interface element 20 with respect to the body 12 of the machine 10 about the axis X10 so as to maintain the face 20a of the interface element 20 (where the pushbuttons 200 and/or the display 202 are located) always oriented towards the outside of the surface P.

In this way, the pushbuttons 200 and/or the display 202 may remain visible and usable practically in the same way irrespective of whether (for example, according to the requirements of application and use) the machine 10 is set on the surface P sideways on (as exemplified in FIG. 2) or lengthwise (as exemplified in FIG. 3) or in any other angular position of orientation (as exemplified in FIG. 4).

In one or more embodiments, the interface element 20 may be mounted on the body 12 of the machine 10 for example according to a general flag-like configuration that enables orientation (rotation) thereof about to the axis X10.

In one or more embodiments, the interface element 20 may have, for example, a cantilever shape with a proximal part (which is, for example, horizontal) pivoted on the body of the machine about the axis X10 and a distal part (which is, for example, vertical) that carries at the front the face 20a with the pushbuttons 200 and/or the display 202.

In one or more embodiments, the interface element 20 may have associated thereto electrical-contact elements (for example, sliding-contact elements, of a type in itself known), which are designed to facilitate electrical contact of the pushbuttons 200 and/or of the display 202 with respect to the various members of the machine 10.

In one or more embodiments, the aforesaid movement of orientation of the interface element 20 with respect to the body 12 may be obtained over an angular range, for example, of 90°. In one or more embodiments, it is possible to choose different ranges of angular orientation, possibly narrower or wider, for example a range of orientation of 180° so that the interface element 20 (for example, its front surface 20a) can be set:

- on one side of the body 12 (as represented with a dashed line in FIG. 1);
- on the front end of the body 12 (as exemplified with a solid line in FIG. 1); or
- on the other side of the body 12, i.e., in a position specularly symmetrical with respect to the one represented with a dashed line in FIG. 1.

In one or more embodiments, the aforesaid movement of orientation may be made through a continuous range of angular positions of orientation, with the possibility for the user to choose practically any angular position of orientation about the axis X10.

In one or more embodiments, it may be envisaged that the movement of orientation is made in steps, for example through distinct and separate angular positions, for instance having values of 45°, 30°, 10°, etc., with the interface element 20 (loosely) withheld in each of these positions with the capacity of being displaced from one position to another with a simple manual action.

In one or more embodiments, a beverage-dispensing machine (e.g., 10) may be positioned in at least one first position and at least one second position, the first and second positions being rotated with respect to one another about an axis of orientation (e.g., see α and X10 in FIGS. 2 to 4).

In one or more embodiments, the machine may comprise a user-interface element (e.g., 20) carried by the machine rotatably about said axis of orientation, the interface element being rotatable about said axis of orientation, with said interface element that is configured to maintain a certain spatial orientation irrespective of whether the machine is positioned in said at least one first position or in said at least one second position (see, for example, once again FIGS. 2 to 4).

In one or more embodiments the machine may comprise a flat machine body.

In one or more embodiments, the machine may comprise at least one supporting formation (e.g., 22) for supporting the machine with said axis of orientation set in a vertical direction.

In one or more embodiments, the machine may comprise a beverage-dispensing outlet (e.g., 18), with the user-interface element set in the proximity of the beverage-dispensing outlet.

In one or more embodiments, the user-interface element may be located above said beverage-dispensing outlet.

In one or more embodiments, the user-interface element may be mounted in flag fashion on the body of the machine.

In one or more embodiments, the user-interface element may be rotatable over an angular range of at least 90° (e.g., 180°, see FIG. 1).

In one or more embodiments, the user-interface element may be rotatable through a continuous set of angular positions.

Without prejudice to the underlying principles, the details of construction and the embodiments may vary, even significantly, with respect to what is illustrated herein purely by way of non-limiting example, without thereby departing from the scope of protection, which is determined by the annexed claims.

The invention claimed is:

1. A beverage dispensing machine, the machine adapted to be positioned in at least one first position and at least one second position, the first position and second position mutually rotated with respect to an orientation axis, wherein the machine includes a user interface member carried by the machine, the user interface member pivotable with respect to said orientation axis with said user interface member adapted to maintain a certain orientation in space irrespective of the machine being positioned in said at least one first position or in said at least one second position, wherein the user interface member has a cantilever shape with a proximal horizontal part pivoted on a body of the machine about said orientation axis and a distal vertical part that has, at a front of the distal vertical part, a face with pushbuttons and/or display elements for operating and/or controlling the machine, wherein the user interface member that is cantilever-shaped consists of the proximal horizontal part rigidly connected, permanently fixed, to the distal vertical part, and wherein the user interface member, the proximal horizontal part and the distal vertical part, is only pivotable around the orientation axis.

2. The beverage dispensing machine of claim 1, wherein the machine includes a flat machine body.

3. The beverage dispensing machine of claim 1, wherein the machine includes at least one support formation supporting the machine with said orientation axis in a vertical direction.

4. The beverage dispensing machine of claim 1, including a beverage dispensing outlet, with the user interface member arranged in proximity of the beverage dispensing outlet.

5. The beverage dispensing machine of claim 4, wherein the user interface member is located above the beverage dispensing outlet.

6. The beverage dispensing machine of claim 1, wherein the user interface member is mounted flag-like onto the machine body.

7. The beverage dispensing machine of claim 1, wherein the user interface member is pivotable over an angular range of at least 90°.

8. The beverage dispensing machine of claim 1, wherein the user interface member is pivotable over a continuum of angular positions.

* * * * *